3,193,376
BENEFICIATION OF ILMENITE
Ching-lung Lo, Plainview, N.Y., and Thomas S. Mackey, Texas City, Tex., assignors to Wah Chang Corporation, New York, N.Y., a corporation of New York
No Drawing. Filed Dec. 4, 1961, Ser. No. 156,931
7 Claims. (Cl. 75—2)

This invention relates to the beneficiation of titaniferous ores and particularly to an improved process for the economic beneficiation of ilmenite to produce rutile-like materials of improved character.

The limited availability of natural rutile has created a continual demand for rutile-like materials, particularly by the pigment industry, resulting from the beneficiation of more abundant lower grade ores, such as ilmenite. Ilmenite, although relatively abundant, contains appreciable ferrous and/or ferric iron and the art has long concerned itself with treatment of ilmenite with mineral acids, usually hydrochloric, with wide ranges of concentration, temperatures, pressures and durations to the end of economically producing an acceptable low iron content rutile-like material therefrom. Most, if not all, of these procedures, however, are uneconomic in nature requiring excessive temperatures or pressures, excessive reaction times and quantities of reagents or pretreatment of the ores. In addition, the products resulting therefrom have not proved particularly suitable, due to the presence of undue amounts of fines contained therein, for utilization in the fluidized bed chlorination process, which is rapidly being adopted for the production of $TiCl_4$ by the manufacturers of $TiO_2$ pigments, titanium metal and other related titanium products.

This invention may be briefly described as an improved process for the efficient and economic beneficiation of ilmenite to produce a rutile-like product of improved character that is particularly adapted, by reason of the minimization of fines, for use as feed material for the fluidized bed chlorination process for production of $TiCl_4$.

The primary object of this invention is the provision of an improved efficient and economic process for producing a rutile-like structure of improved character from ilmenite.

In accordance with the present invention most of the objectionable features attendant the prior art processes are minimized, if not avoided. We have found that the presence of undesired fines in the resulting product can be avoided by adherence to the hereinafter disclosed conditions of operation, which are, unexpectedly, of such nature as to minimize, if not avoid, the economic disabilities attendant the practices of the prior art.

In its broad aspects the subject invention provides for a two step leaching process in which the total hydrochloric acid values utilized in the first and second stage leaches does not exceed about a 20% excess over the stoichiometric amounts required for dissolution of the undesired acid-soluble non-titaniferous values in the ore, and wherein the hydrochloric acid solution for the first step leaching of any batch is a mixed solution constituted from the leach liquor of the second leaching of a previous batch plus the necessary amount of fresh commercial grade (20° Bé.) hydrochloric acid to provide about 60% of the stoichiometric amounts required to react with the iron and other acid soluble values other than $TiO_2$ in the ore. The second leaching employs fresh commercial grade hydrochloric acid (20° Bé.) in an amount to provide a stoichiometric excess of about 50% for the remaining iron and other acid soluble values other than $TiO_2$ in the once leached product. Both of the leaching steps proceed under a pressure of from 30–35 p.s.i.g. and with an operating temperature range of from about 105° to 110° C.

Under these operating conditions each leaching step requires only about 4 to 6 hours to proceed to completion and the resultant liquor is found to contain 95% or more of the iron values present in the original ilmenite and a minimum of the original titanium values and the solid residue, apart from assaying over 90% $TiO_2$, has been found to have a particle size range that is essentially the same as that of the starting ilmenite ore.

Although the mechanics of the operation are not completely understood at the present time, it is believed that the specified operating conditions are such as to materially minimize the dissolving of titanium values, which dissolved titanium values in other processes and under other operating conditions are believed to reprecipitate as the undesired fines. It is further believed that the first stage leach effects a selective removal of the ferrous iron values and that the presence of dissolved $TiO_2$ values in the recycled leach liquor minimizes the dissolving of the $TiO_2$ values in the starting ore such dissolved $TiO_2$ values remaining in solution and forming part of the waste liquor resulting from the process. The second stage leach is believed to continue the removal of the ferrous iron values and effects the removal of the ferric iron values while the dissolved $TiO_2$ values remain in the leach liquor with the result that the solid residue, which is the beneficiated ore, is singularly free of undesired fines.

The subject invention may conveniently be practiced in enclosed reaction vessels constructed of mild steel with an inside lining of rubber and acid resisting bricks, which serves to resist acid corrosion, to minimize heat loss to preserve the operating temperature within the desired limits, to exclude air and maintain the desired range of operating pressures.

The following is illustrative of a composite of quantitative experimental results obtained through such two step leaching operation with adherence to the above set forth conditions of operation, employing beach sand ilmenites from Australia, Africa and India.

| Chemical analysis | Ilmenite, percent | Beneficiated product, percent |
|---|---|---|
| $TiO_2$ | 54.44 | 93.00 |
| $FeO$ | 23.54 | 0.32 |
| $Fe_2O_3$ | 18.37 | 3.70 |
| $Al_2O_3$ | 0.72 | 0.11 |
| $Cr_2O_3$ | 0.03 | 0.05 |
| $MnO$ | 1.59 | 0.02 |
| $ZrO_2$ | 0.10 | 0.17 |
| $SiO_2$ | 0.56 | 1.02 |
| $V_2O_5$ | 0.05 | 0.04 |

As mentioned above, adherence to the herein specified operating conditions results, through the avoidance of fines, in a beneficiated product of improved character. The following table indicates the *substantially unchanged* nature of the particle size distributions in the ilmenite and beneficiated product resulting from the above disclosed two step leaching operation.

| Screen analysis (Tyler) | Ilmenite, percent | Beneficiated product, percent |
|---|---|---|
| −40 +60 | 2.52 | 1.78 |
| −60 +80 | 18.23 | 17.12 |
| −80 +100 | 51.55 | 50.91 |
| −100 +150 | 26.73 | 28.92 |
| −150 +200 | 0.85 | 0.88 |
| −200 | 0.22 | 0.19 |

The following tables setting forth an hourly analysis of leach solution and temperature for two different acid mixtures is believed to be indicative of the criticality of the temperature and acid parameters in the disclosed subject matter.

TABLE I

FIRST STAGE LEACHING (MIXED ACID SOLUTION PREHEATED BEFORE CHARGING)

| Time | HCl, g./l. | Ferrous iron, g./l. | Ferric iron, g./l. | TiO$_2$, g./l. | Temperature, °C. |
|---|---|---|---|---|---|
| 1st hour | 157.1 | 31.5 | 28.5 | 4.43 | 85 |
| 2nd hour | 113.0 | 69.0 | 30.5 | 1.82 | 108 |
| 3rd hour | 74.1 | 106.0 | 27.5 | 0.87 | 110 |
| 4th hour | 34.8 | 118.0 | 29.0 | 0.63 | 110 |

SECOND STAGE LEACHING: USING FRESH ACID

| Time | HCl, g./l. | Ferrous iron, g./l. | Ferric iron, g./l. | TiO$_2$, g./l. | Temperature, °C. |
|---|---|---|---|---|---|
| 1st hour | 208.2 | 53.5 | 34.0 | 1.67 | 104 |
| 2nd hour | 175.8 | 62.0 | 44.5 | 1.02 | 107 |
| 3rd hour | 171.3 | 63.0 | 40.0 | 0.87 | 107 |
| 4th hour | 154.3 | 59.5 | 70.5 | 0.58 | 107 |

The efficacy of the described preferred two step leaching using a mixed acid solution for the first step leaching operation under the stated operating conditions in minimizing the production of fines is emphasized by a comparison of the above with a similar two step leaching operation utilizing fresh commercial grade, i.e. 20° Bé., hydrochloric acid for both leaching steps, the results of which are set forth in the following table.

TABLE II

FIRST STAGE LEACHING (FRESH ACID, UNHEATED)

| Time | HCl, g./l. | Ferrous iron, g./l. | Ferric iron, g./l. | TiO$_2$, g./l. | Temperature, °C. |
|---|---|---|---|---|---|
| 1st hour | 289.3 | 0.5 | 4.5 | 0.54 | 45 |
| 2nd hour | 275.0 | 1.5 | 5.5 | 4.64 | 56 |
| 3rd hour | 230.6 | 6.0 | 16.5 | 11.97 | 85 |
| 4th hour | 109.3 | 76.0 | 55.5 | 2.14 | 109 |
| 5th hour | 73.6 | 93.5 | 48.0 | 0.71 | 110 |

SECOND STAGE LEACHING: USING FRESH ACID

| Time | HCl, g./l. | Ferrous iron, g./l. | Ferric iron, g./l. | TiO$_2$, g./l. | Temperature, °C. |
|---|---|---|---|---|---|
| 1st hour | 171.0 | 44.0 | 29.5 | 0.71 | 108 |
| 2nd hour | 179.0 | 43.0 | 36.0 | 2.14 | 108 |
| 3rd hour | 150.4 | 42.5 | 30.5 | 2.14 | 109 |
| 4th hour | 113.0 | 45.5 | 53.0 | 0.71 | 110 |

As above shown in the latter example, the dissolved TiO$_2$ reaches about 12 g./l. at 85° C. before it precipitates out in very finely divided form whereas, in the example set forth in Table I, the TiO$_2$ only reaches about 4½ g./l. at the same temperature as a maximum. A comparison of the temperature values also indicates the desirability of raising the operating temperature to about the 105° to 110° C. range as quickly as possible after initiation of the reaction and the maintenance of such temperature range throughout the reaction period.

The economies attendant the above described process may well render the recovery of the iron values from the leach liquor commercially practicable. The combined leach liquor resulting from the first stage leaching operation usually will have the following approximate composition:

| | Percent |
|---|---|
| FeCl$_2$ | 15–20 |
| FeCl$_3$ | 8–11 |
| MnCl$_2$ | 0.5–1 |
| HCl | 3–5 |

Such leach liquor will contain about 95% of the iron values that were present in the original ilmenite. This solution may be readily concentrated to crystallize out as much as 80% of the FeCl$_2$ in the form of FeCl$_2$.4H$_2$O. After such separation of the ferrous chloride crystals, the mother liquor may be conveniently reacted with chlorine gas to convert the FeCl$_2$ remaining in the solution to FeCl$_3$. The chlorinated solution may then be evaporated for the crystallization of FeCl$_3$.6H$_2$O. Both the ferric and ferrous chlorides resulting from the above described separation are of independent utility.

Having thus described our invention, we claim:

1. In the beneficiation of ilmenitic ore, a two step process for effecting the selective and preferential dissolution of undesired acid-soluble non-titaniferous values therein comprising the step of first subjecting said ore to the leaching action of a mixed acid solution formed of second stage leach liquor and sufficient additional fresh hydrochloric acid of at least 20° Bé. strength to provide about 60% of the stoichiometric amount required for dissolution of said undesired acid-soluble non-titaniferous values therein to effect preferential dissolution of said acid-soluble non-titaniferous values and to minimize the dissolution of titaniferous values therein, then subjecting the leached residue of said first stage leaching operation to a second stage leaching action of fresh hydrochloric acid of at least 20° Bé. strength in an amount constituted to provide about a 50% excess over the stoichiometric amount thereof required for dissolution of the remaining undesired acid-soluble non-titaniferous values in said first stage leached residue and maintaining the temperature of the leach liquid at least 105° C. during the major portion of said first and second stage leaching operations.

2. The process as set forth in claim 1 wherein the total acid values utilized in said first and second stage leaching operations does not exceed about a 20% excess over the stoichiometric amounts required for dissolution of the undesired acid-soluble non-titaniferous values in said ore.

3. The process as set forth in claim 1 including maintaining the temperature of the leach liquid between 105 and 110° C. during at least the major portions of said first and second stage leaching operations.

4. The process as set forth in claim 1 including maintaining a pressure of at least 30 pounds per square inch during at least the major portions of said first and second stage leaching operations.

5. In the beneficiation of ilmenite ore, a two step process for effecting the selective dissolution of undesired acid-soluble non-titaniferous values therein comprising the step of first subjecting said ore to the leaching action of a mixed acid solution formed of second stage leach liquor and sufficient additional commercial grade 20° Bé. hydrochloric acid to provide about 60% of the stoichiometric amount required for dissolution of said undesired acid-soluble non-titaniferous values therein, subjecting the leached residue of said first stage leaching operation to a second stage leaching action of fresh commercial grade 20° Bé. hydrochloric acid in an amount constituted to provide about a 50% excess over the stoichiometric amount thereof required for dissolution of the remaining undesired acid-soluble non-titaniferous values in said first stage leached residue and maintaining the temperature of the leach liquid between 105 and 110° C. during at least the major portions of said first and second stage leaching operations.

6. The process as set forth in claim 5 wherein the total acid values utilized in said first and second stage leaching operations does not exceed about a 20% excess over the stoichiometric amount required for dissolution of the undesired acid-soluble non-titaniferous values in said ore.

7. The process as set forth in claim 5 including maintaining a pressure between 30 and 35 pounds per square inch during at least the major portions of said first and second stage leaching operations.

References Cited by the Examiner
UNITED STATES PATENTS

| | | | |
|---|---|---|---|
| 2,406,577 | 8/46 | Alessandroni et al. | 75—114 |
| 2,804,375 | 8/57 | Kamlet | 23—202 |
| 2,875,039 | 2/59 | Bachmann | 75—114 |
| 2,961,298 | 11/60 | Tikkanen | 23—202 |
| 3,006,728 | 10/61 | Wainer | 23—202 |

BENJAMIN HENKIN, *Primary Examiner.*

WINSTON A. DOUGLAS, DAVID L. RECK, *Examiners.*